(12) United States Patent
Mitsuzono et al.

(10) Patent No.: US 6,796,878 B2
(45) Date of Patent: Sep. 28, 2004

(54) NC MACHINE TOOL WITH TILTABLE SPINDLE UNIT

(75) Inventors: Masaaki Mitsuzono, Numazu (JP); Kenji Miura, Numazu (JP); Yutaka Tsukita, Mishima (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/184,882

(22) Filed: Jul. 1, 2002

(65) Prior Publication Data

US 2003/0010143 A1 Jan. 16, 2003

(30) Foreign Application Priority Data

Jul. 2, 2001 (JP) .................................... 2001-201063

(51) Int. Cl.[7] .............................................. B24B 49/00
(52) U.S. Cl. .................... 451/5; 451/8; 451/9; 451/47; 451/900
(58) Field of Search ........................... 451/5, 8, 9, 47, 451/56, 147, 161, 449, 900

(56) References Cited

U.S. PATENT DOCUMENTS

| | | | | | |
|---|---|---|---|---|---|
| 3,577,683 A | * | 5/1971 | Silvagi et al. | .............. | 451/216 |
| 4,617,764 A | * | 10/1986 | Reibakh | .................. | 451/5 |
| 4,953,522 A | * | 9/1990 | Vetter | ................ | 125/11.01 |
| 5,895,311 A | * | 4/1999 | Shiotani et al. | ............ | 451/5 |
| 6,217,409 B1 | * | 4/2001 | Stadtfeld et al. | .......... | 451/5 |
| 6,220,928 B1 | * | 4/2001 | Okabe et al. | ............ | 451/5 |
| 6,244,928 B1 | * | 6/2001 | Hiramoto | ................. | 451/5 |
| 6,379,218 B1 | * | 4/2002 | Bailer et al. | ............ | 451/8 |

* cited by examiner

Primary Examiner—Joseph J. Hail, III
Assistant Examiner—Anthony Ojini
(74) Attorney, Agent, or Firm—Pillsbury Winthrop LLP

(57) ABSTRACT

There is provided an NC machine tool with tiltable spindle unit capable of being used both as vertical and inclined spindle type machine tools without restrictions on stroke and capable of easily carrying out tool measurement, alignment of a work piece with a tool, and truing. The NC machine tool includes: a spindle unit having a spindle serving both as a vertical spindle and an inclined spindle; and a tilting mechanism having a turning shaft for pivotably supporting the spindle unit on a vertical plane. The turning shaft has a center line of rotation which is arranged in the vicinity of a top end of a tool on a center line of the tool.

7 Claims, 7 Drawing Sheets

(a)

(b)

WORKING BY VERTICAL SPINDLE (a)

WORKING BY INCLINED SPINDLE (b)

NC MACHINE TOOL WITH TILTABLE SPINDLE UNIT

BACKGROUND OF THE INVENTION

1. Field of the Invention

The present invention generally relates to an NC machine tool with a tiltable spindle unit. More specifically, the invention relates to an NC machine tool with a tiltable spindle unit for selectively using a vertical spindle and an inclined spindle in a tool mounting position.

2. Description of the Prior Art

In recent years, NC machine tools capable of shaping optical parts ultra-precisely, such as lenses, have been developed. An ultra-precise NC machine tool of this type can work a concave surface of a lens precisely by using a grindstone or end mill with a flat or spherical end. Conventional NC machine tools for shaping concave surfaces of lenses or the like include vertical spindle type machines, the tool mounting position of which extends in vertical directions, and inclined spindle type machines, the tool mounting position of which is inclined.

FIG. 6a schematically shows a concave surface grinding using a vertical spindle type machine, FIG. 6b shows a concave surface grinding using an inclined spindle type machine.

As shown in FIG. 6a, in a case where a concave surface of a workpiece W with a relatively small diameter is grinded by means of a grindstone 1 attached to a vertical spindle 3, the vertical spindle 3 interferes with the outer circumferential edge portion on the concave surface of the workpiece W, if the radius of curvature on the concave surface of the workpiece W is large and if the spindle 3 having the grindstone 1 is relatively thick with respect to the radius of the grindstone 1. To avoid the interference, the diameter of the spindle 3 must be as small as possible.

However, if the diameter of the workpiece W is 3 mm or less, the rigidity of the spindle 3 attached to the grindstone 1 is reduced, so that a precise working can not be achieved. In a case where a spindle 4 attached the grindstone 1 with a larger diameter having a high rigidity is tilted as shown in FIG. 6b, it is possible to work the concave surface without interfering with the workpiece W. Thus, conventionally, the vertical spindle and the inclined spindle are selectively used for working the concave surface of a small work having a diameter of a few millimeters while insuring the rigidity of the spindles.

FIGS. 7 and 8 show a conventional NC machine tool capable of being used both as a vertical spindle type machine and an inclined spindle type machine in accordance with a work to be grinded or milled. In FIG. 7, a spindle is set to a vertical orientation. In FIG. 7, reference number 10 denotes a column with slide, 12 denotes a spindle unit for vertical oriented spindle, and 14 denotes a rotary unit for rotating a workpiece mounted thereon. The column with slide 10 is designed to be fed perpendicular to the plane of the figure by a control axis extending in directions of X-axis. The spindle unit 12 is detachably mounted on a slide 17 which is vertically movable along a slideway of the column with slide 10 via a vertical spindle mounting base 16. The control axis for feeding the spindle 12 is Y-axis. A vacuum chuck 18 is mounted on the end portion of the rotating shaft of the rotary unit 14, and the workpiece W is held on the vacuum chuck 18 via a fixture 19 by vacuuming air. The rotary unit 14 is installed on a table 22. The table 22 is designed to be fed in directions of Z-axis as control axes, perpendicular to Y-axis and X-axis. The spindle unit 12 shown in FIG. 7 includes a drive unit for a spindle 20. On the top end of the spindle 20, a tool, such as a grindstone or an end mill, is mounted.

On the other hand, FIG. 8 shows a operating manner in which a spindle is changed to an inclined spindle type. The spindle can be changed to an inclined spindle type by replacing the spindle unit 12 for vertical spindle shown in FIG. 7 with a spindle unit 24 for inclined spindle. In this case, the spindle unit 24 for inclined spindle is detachably mounted on the slide 17 via an inclined spindle mounting base 25.

Such a conventional NC machine tool can work precisely the concave surface of the workpiece W by making replacement selectively between the spindle unit 12 for vertical spindle shaft with the spindle unit 24 for inclined spindle without changing other mechanical parts, such as the column with slide 10 and the rotary unit 14.

In an NC machine tool of this type, it is required to measure a tool length, a tool diameter and a working point of the tool for preparations of the machining. Because the tool length, the tool diameter and so forth are data indispensable for grasping the working point of the tool precisely to conduct the position-control the spindle. In the case of the vertical spindle, it is easy to measure the tool length, the tool diameter and so forth, whereas in the case of the inclined spindle, it is very difficult to precisely measure the tool diameter and the working point the tool attached to the spindle 20 since the tool is inclined on the mounting position.

For that reason, in the case of the inclined shaft, it is the conventional practice that a tool wherein its diameter and so forth have been measured is mounted, and the measured values are used for preparing NC data, so that the alignment of a work piece with the tool is carried out on the basis of experience and practical sense after trial-and-error.

In the case of the inclined spindle, there is a problem in that it is very difficult to precisely carry out truing in addition to the problem on tool measurement, since the grindstone mounting position is inclined. Particularly, if the grindstone is eccentric, it is very difficult to carry out truing for correcting eccentricity.

Moreover, in FIGS. 7 and 8, it is assumed that the distance between the end face of the vacuum chuck 18 and the slide 17 of the column with slide 10 is L, the distance between the end face of the vacuum chuck 18 and the center of the tool is L1, and the distance between the center of the tool and the slide 17 is L2. In the case of the inclined spindle, the distance L1 between the end face of the vacuum chuck 18 and the center of the tool is far shorter than that in the case of the vertical spindle. Therefore, in order to insure a constant stroke in Z-axis in the case of the inclined shaft, the whole machine must be large, or the column with slide 10 must be replaced.

SUMMARY OF THE INVENTION

It is therefore an object of the present invention to eliminate the aforementioned problems and to provide an NC machine tool with tiltable spindle unit capable of being used both as vertical and inclined spindle type machine tools without restrictions on stroke and capable of easily carrying out tool measurement, alignment of a work piece with a tool, and truing.

In order to accomplish the aforementioned and other objects, according to one aspect of the present invention, an NC machine tool with a tiltable spindle unit having a plurality of control axes, comprises: a spindle unit having a spindle serving both as a vertical spindle for keeping a tool in a vertical position and an inclined spindle for keeping the tool in a inclined position; a column for installing the spindle unit thereon; a table for supporting a workpiece; a turning shaft for pivotably supporting the spindle unit on a vertical plane, and a tilting means for changing the position of the spindle unit between the vertical position and the inclined position; wherein the turning shaft has a center of rotation which is arranged in the vicinity of a top end of the tool in alignment with a center line of the tool.

The tilting means part may comprises a mounting bracket mounted on a slide which vertically moves along a guide on a side of the column; a spindle unit bracket to which the spindle unit is fixed and which is connected to the turning shaft; a bearing, fixed to the mounting bracket, for horizontally supporting the turning shaft; and a positioning means for selectively positioning the spindle unit at the vertical position and the inclined position.

The NC machine tool with pivot may further comprise a a rotary unit, located on the table, for rotating the workpiece on a center line of the workpiece, said rotary unit having a chuck means capable of holding the workpiece The NC machine tool may further comprise measuring means for measuring a distance from a center of the workpiece to an end face of the tool in a vertical attitude, and a diameter of the tool to output measured data to a numerical control unit.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings.

DESCRIPTION OF THE PREFERRED EMBODIMENTS

Referring now to the accompanying drawings, a preferred embodiment of an NC machine tool with pivot according to the present invention will be described below.

Figure 1:
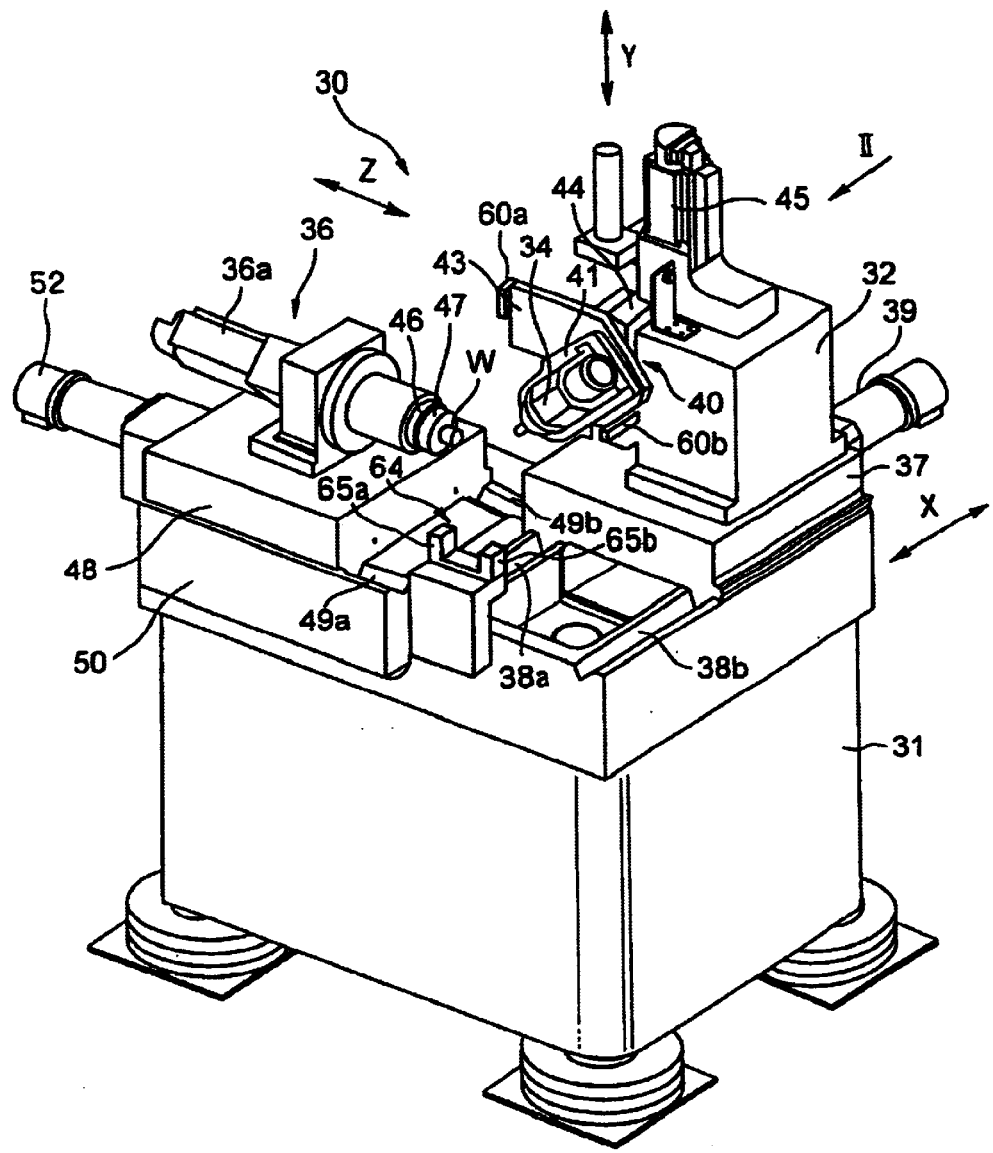
FIG. 1 is a perspective view showing a preferred embodiment of an NC machine tool according to the present invention.
Figure 2:
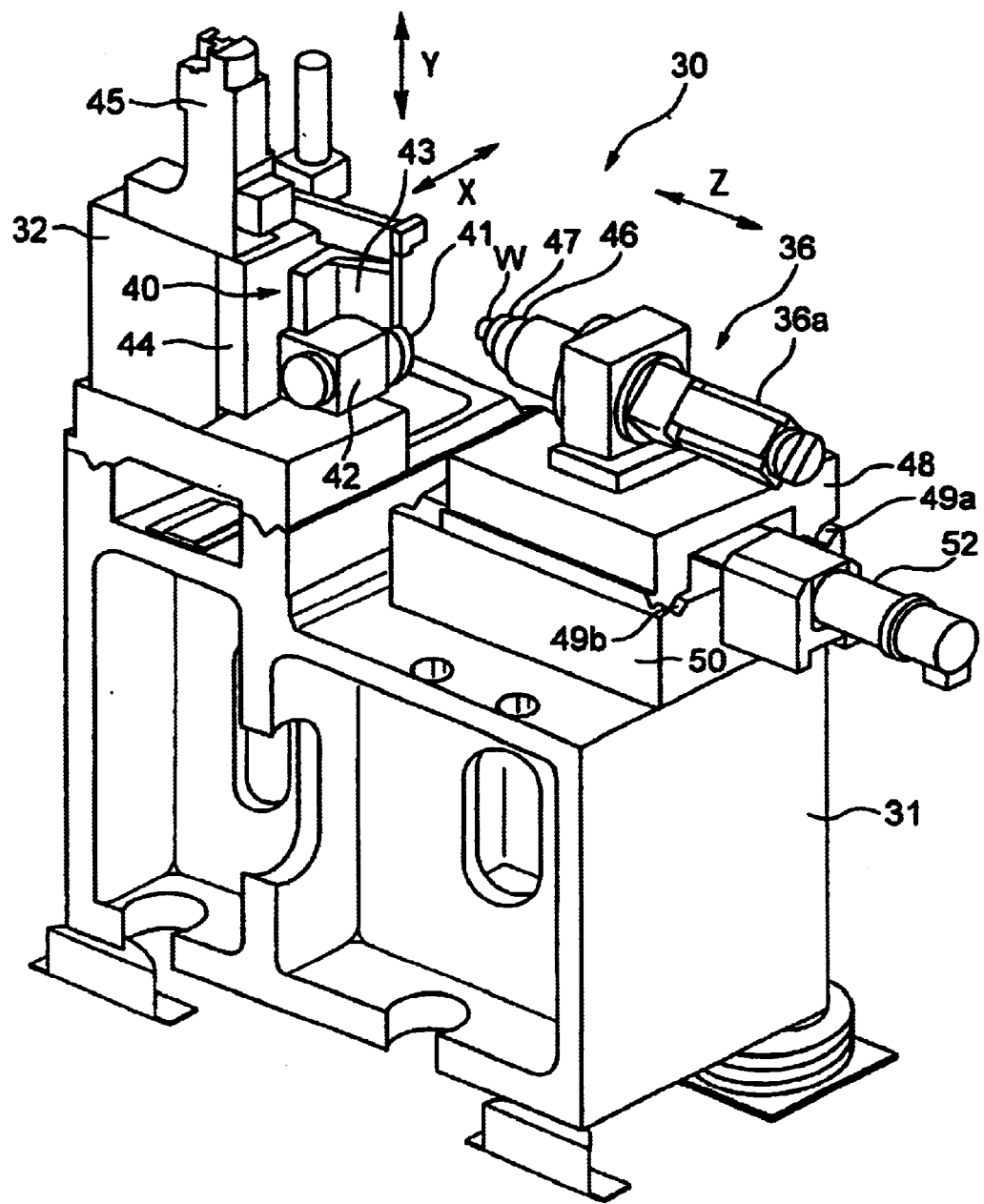
FIG. 2 is a perspective view of the NC machine tool viewed along arrow II in FIG. 1.

FIG. 1 is a perspective view showing a preferred embodiment of an NC machine tool with tiltable spindle unit according to the present invention, and FIG. 2 is a perspective view of the NC machine tool viewed along arrow II in FIG. 1.

In FIGS. 1 and 2, reference number 30 shows the whole NC machine tool. In this preferred embodiment, the NC machine tool 30 is a precision finishing machine adapted to work the concave surface of a optical part for high precision, such as a lens, by means of a grindstone or an end mill. Reference number 31 denotes a bed of the machine body. Reference number 32 denotes a column with slide, and 34 denotes a spindle unit. In FIG. 1, the spindle unit 34 turns by 45 degrees from a vertical position of the spindle unit 34, so that the position of the spindle unit 34 is changed to an inclined position. Reference number 36 denotes a rotary unit for rotating a mounted workpiece w.

The column with slide 32 is installed on a column base 37. The column base 37 can move slidably along guides 38a and 38b provided on the top side of the bed 31. A control axis for feeding the column with slide 32 is X-axis. Reference number 39 denotes a servomotor for driving an X-axis feed mechanism.

The spindle unit 34 is pivotably supported on a vertical plane by means of a tilting mechanism 40 having a turning shaft (not shown in FIGS. 1 and 2). The tilting mechanism 40 comprises a spindle unit bracket 41, on which the spindle unit 34 is mounted and which is connected to a turning shaft (not shown), and a bearing 42 for supporting the turning shaft. As shown in FIG. 1, in this preferred embodiment, the spindle unit 34 and the spindle unit bracket 41 integrally turn by 45 degrees between positioning blocks 60a and 60b provided on a mounting bracket 43. The positioning block 60a positions the spindle unit 34 at a vertical position, and the positioning block 60b positions the spindle unit 34 at an inclined position which is inclined from the vertical position by 45 degrees. The bearing 42 is mounted on a slide 44 member which is arranged on the side of the column with slide 32 by the mounting bracket 43. Therefore, the integrated unit of the tilting mechanism 40 and spindle unit 34 can be mounted, via the mounting bracket 43, on the slide member 44 which is vertically movable along a slideway provided on the side of the column 32. A control axis for vertically feeding the spindle unit 34 is Y-axis. Reference number 45 denotes a servomotor for driving a Y-axis feed mechanism. The details of the turning shaft of the tilting mechanism part 40 will be described later.

The rotary unit 36 has a rotation drive motor 36a. On the top end of the rotating shaft 36b thereof, a vacuum chuck 46 is mounted. A workpiece W can be held on the vacuum chuck 46 via a fixture 47 under vacuuming condition. The rotary unit 36 can precisely hold a workpiece W having a diameter of about 2 to 5 mm coaxially by means of the vacuum chuck 46. The rotary unit 36 is fixed to a table 48. The table 48 is installed on a table base 50 having guides 49a and 49b on its top face. The table 48 is movable along the guides 49a and 49b in directions perpendicular to X-axis and Y-axis. A control axis for feeding the table 48 is Z-axis. Reference number 52 denotes a servomotor for driving a Z-axis feed mechanism.

Figure 3:
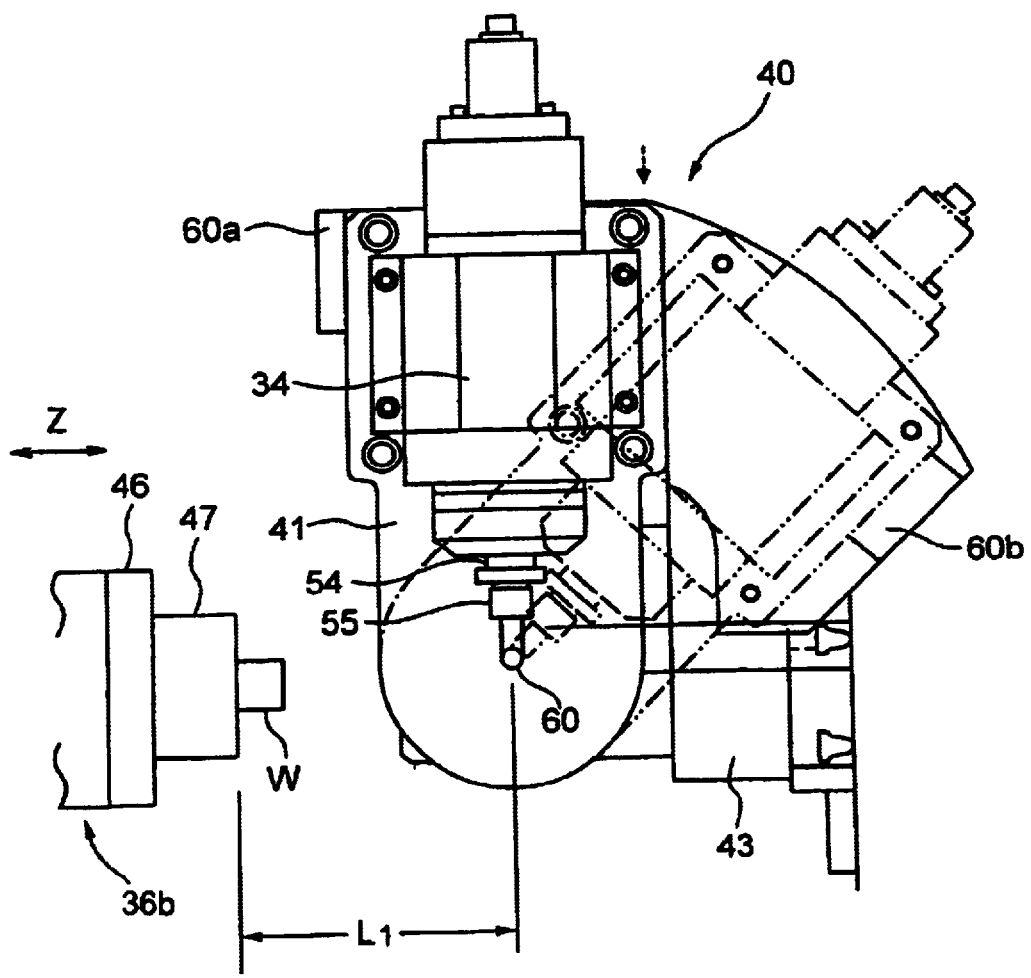
FIG. 3 is a front view of a spindle unit of the NC machine tool of FIG. 1.

FIG. 3 is a front view of the spindle unit 34. The spindle unit 34 includes a drive unit for a spindle 54. On the front end of the spindle 54, a tool is mounted by using a collet chuck 55. As the tool, a grindstone as well as an end mill can be mounted.

In FIG. 3, reference number 60 denotes a turning shaft of the above described tilting mechanism 40. As shown in FIG.

Figure 5:
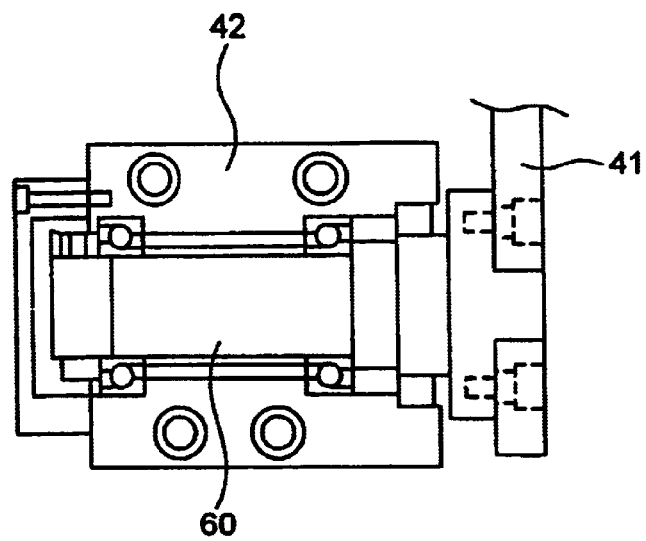
FIG. 5 is a sectional view of a bearing for supporting a turning shaft of the NC machine tool of FIG. 1.

4, the center of turn for the turning shaft 60 is arranged in the vicinity of the top end of the tool and in alignment with the center line of the tool. FIG. 5 is a sectional view of the bearing 42 for supporting the turning shaft 60. The end portion of the turning shaft 60 is fixed to the spindle unit bracket 41 on which the spindle unit 34 is mounted. The tilting mechanism 40 in this preferred embodiment is not particularly provided with any driving source for rotation, and is turned by a manual operation. However, the tilting mechanism 40 may be rotated by an actuator, such as a cylinder, or an electric motor.

With this construction, the operation of the NC machine tool in this preferred embodiment will be described below.

In FIG. 3, in the case where the spindle unit 34 is used as a vertical spindle type, the spindle unit 34 may be set in a vertical position as shown by solid lines, to cause the left edge portion of the spindle unit bracket 41 to abut on the positioning block 60a to fix the spindle unit 34 by means of a clamp means (not shown). In the case where the spindle unit 34 is used as an inclined spindle type, the whole of the spindle unit 34 and the spindle unit bracket 41 may be turned by 45 degrees about the turning shaft 60, to cause the right edge portion of the spindle unit bracket 41 to abut the positioning block 60b to fix the spindle unit 34 by means of a clamp means (not shown). As can be clearly seen from FIG. 3, since the center of turn for the spindle unit 34 is set in the vicinity of the top end of the tool in alignment with the center line of the tool, the distance L1 between the front end face of the fixture 47 and the center of the tool can hardly change before and after rotation. Therefore, it is possible to eliminate the conventional disadvantage in that the Z-axis feed stroke for the workpiece W is shorten.

Figure 6:
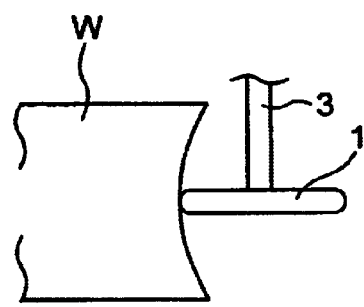
FIGS. 6a and 6b are illustrations for explaining the selective use of a vertical spindle and an inclined spindle when a concave surface is worked in a small-diameter workpiece.
Figure 6:
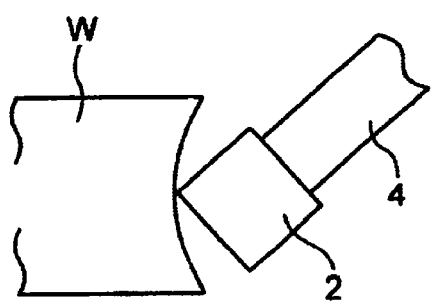
Figure 7:
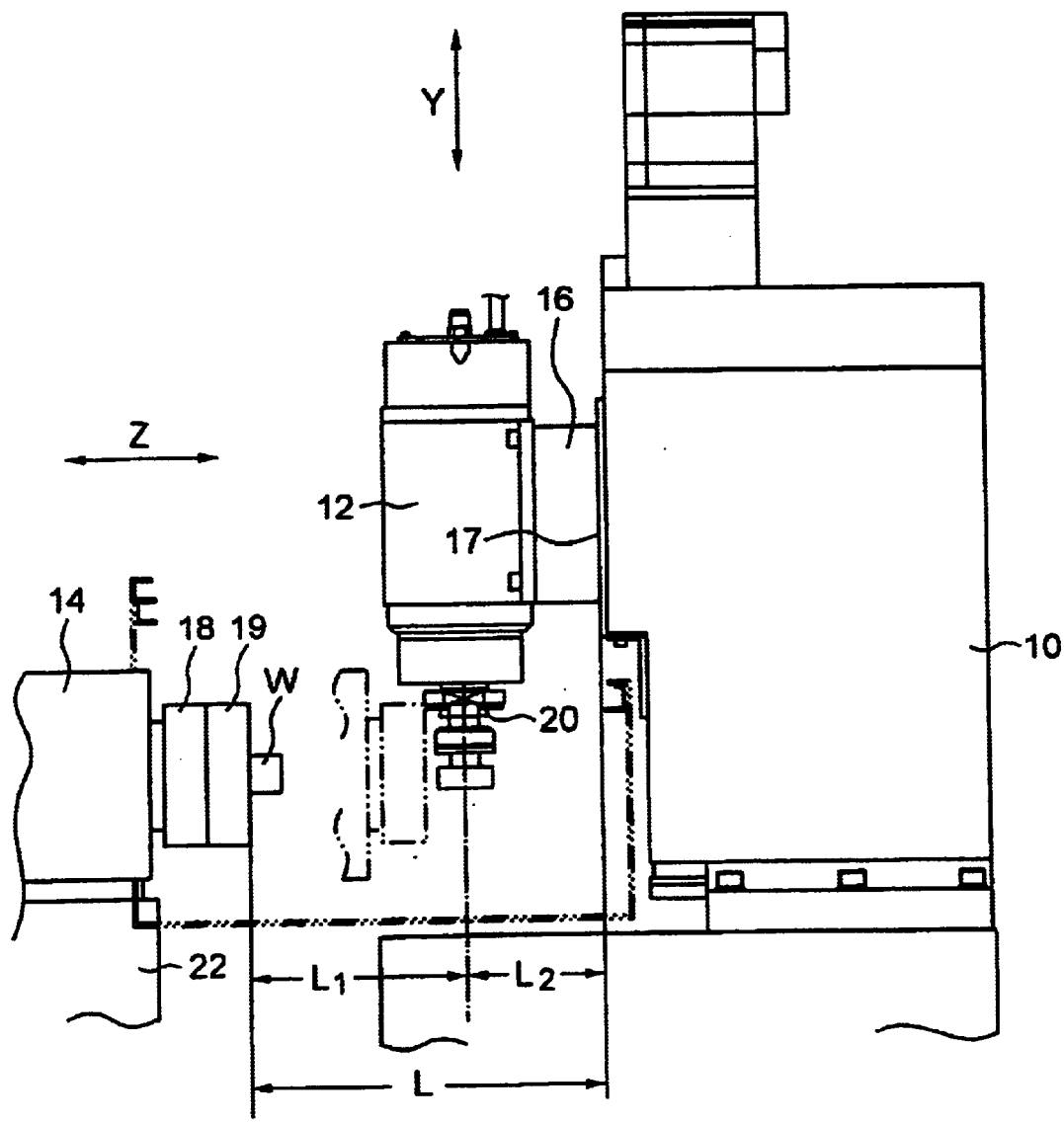
FIG. 7 is a side view of a conventional machine tool used both as vertical spindle and inclined spindle types when it is used as the vertical spindle type.
Figure 8:
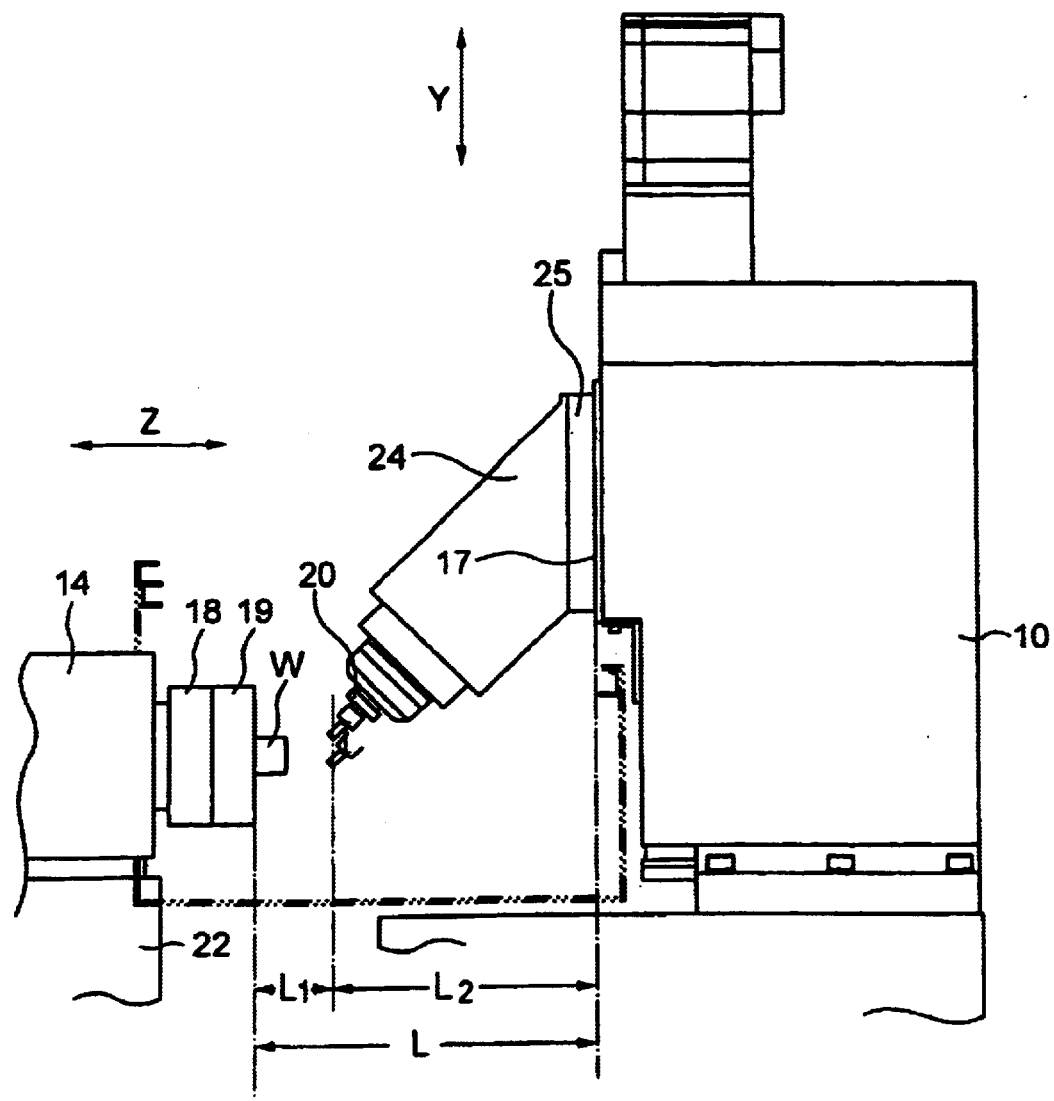
FIG. 8 is a side view of the conventional machine tool used as vertical and inclined spindle types when it is used as the inclined spindle type.

When a workpiece W having a diameter of, e.g., 3 mm or more, is machined to shape a concave surface (including a spherical surface, an axisymmetric aspheric surface, an nonaxisymmetric aspheric surface or the like) by means of the finishing machine in this preferred embodiment, the spindle unit 34 can be set as a vertical spindle type to shape the concave surface with a grindstone 1 by a two-axes (X axis and Y axis synthesizing feed while rotating the work W, as shown in FIG. 6a. When a workpiece W having a diameter of less than 3 mm is machined to shape a concave surface, working can be carried out by an inclined spindle as shown in FIG. 6b. Such change between the vertical position and the inclined position can be easily carried out. Therefore, a single machine can be used both as vertical spindle type and inclined spindle type in accordance with the size of the workpiece W, so that it is possible to carry out precise working while insuring the rigidity of the spindle on which the grindstone 1 is mounted.

Figure 4:
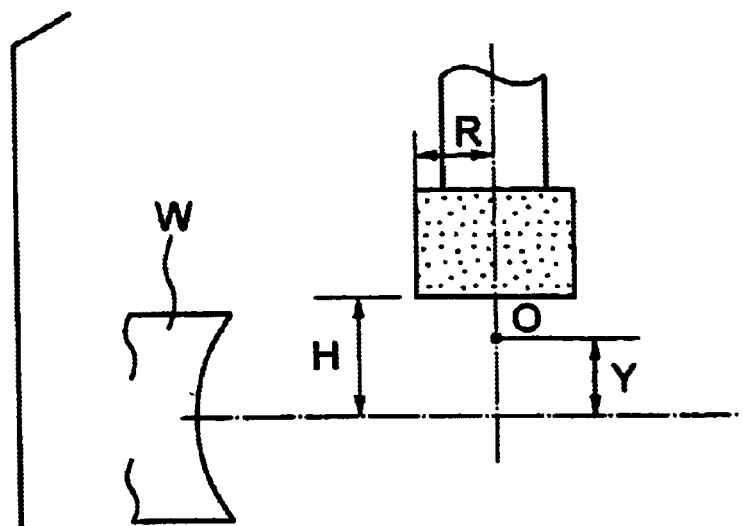
FIGS. 4a and 4b are illustrations for explaining the position of the center of turn of the spindle unit of FIG. 3.
Figure 4:
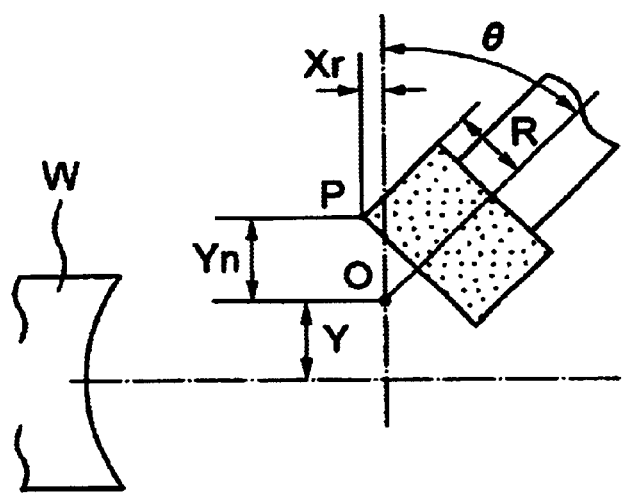

Referring to FIG. 4, tool measurement carried out prior to the start of working, alignment procedure with a work piece during working by an inclined spindle, and truing will be described below.

In FIG. 4, O denotes the center of turn, and R denotes a tool radius, Y denoting a distance from the center of a workpiece W to the center O of turn, and H denoting a distance from the center of the workpiece W to the top end of the tool.

Measurement is carried out while the spindle unit 34 is set in the vertical position to make a tool to be oriented vertically as shown in FIG. 4a. The position of the center of the workpiece W, the position of the center of turn, and the position of the center of the axis of the tool are measured by a well-known calibration unit.

The tool diameter is measured by a non-contact measuring device 64 comprising a laser oscillation unit 65a and a laser receiving unit 65b (see FIG. 1). In this case, while the tool is fed, a position on X-axis at which laser beams received by the laser receiving unit 65b are interrupted is fed to a numerical control unit (not shown) to automatically measure a tool diameter. The tool diameter may be measured by a contact type device.

Then, the spindle unit 34 is turned so that the tool is in an inclined position. At this time, the tool working point is P. Assuming that the angle of rotation is $\theta$, the distance between the center of the workpiece W and the working point P is Yh, and the distance between the center line O of rotation and the working point is Xr, then Yh and Xr are shown by the following expressions.

$$Xr = R\cos\theta - (H-Y)\sin\theta \quad (1)$$

$$Yh = Y + (H-Y)\cos\theta + R\sin\theta \quad (2)$$

Therefore, Yh and Xr can be obtained from the above described measured H, R and $\theta$. Then, by moving the tool by Yh and Xr along Y-axis and z-axis, the operation for causing the tool working point P to be coincident with the center of the workpiece W can be automatically, easily and precisely carried out.

Moreover, according to the present invention, the center of turn is set in the vicinity of the top end of the tool in alignment with the center line of the tool, so that the value of (H—Y) is small. Therefore, the absolute values of measurement errors are small, so that it is possible to precisely calculate Yh and Xr.

Truing in the midst of working by the inclined spindle will be described below. When the shape of the grindstone becomes eccentric, if truing is required, eccentricity can be simply corrected by changing the position of the spindle unit 34 form the inclined position to the vertical position and reshaping. Thereafter, when the position of the spindle unit 34 is changed to the vertical position from the inclined position, the working point does not change before and after truing, so that working can be successively continued.

As can be clearly seen from the above description, according to the present invention, the finishing machine can be used both as the vertical and inclined shaft type machines without restrictions on stroke. In addition, tool measurement, alignment of the work piece with the tool, and truing can be easily carried out when the inclined shaft is used. In particular, the present invention greatly contributes to precise working of a small-diameter work piece to form a concave surface therein.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. An NC machine tool with a tiltable spindle unit having a plurality of control axes, comprising:
   a spindle unit having a spindle serving both as a vertical spindle for keeping a tool in a vertical position and an inclined spindle for keeping the tool in a inclined position;
   a column for installing the spindle unit thereon;
   a table for supporting a workpiece;
   a turning shaft for pivotably supporting the spindle unit on a vertical plane, and a tilting means for changing the position of the spindle unit between the vertical position and the inclined position;

wherein the turning shaft has a center of rotation which is arranged in the vicinity of a top end of the tool in alignment with a center line of the tool, wherein said table is provided with a rotary unit, located on the table, for rotating the workpiece on a center line of the workpiece, said rotary unit having a rotating shaft and a chuck means mounted to said rotating shaft, said chuck means capable of holding the workpiece, and wherein said turning shaft and said rotating shaft are perpendicular to each other in a horizontal plane.

2. An NC machine tool according to claim 1, wherein said tilting means comprises a mounting bracket mounted on a slide which vertically moves along a guide on a side of the column;

a spindle unit bracket to which the spindle unit is fixed and which is connected to the turning shaft;

a bearing, fixed to the mounting bracket, for horizontally supporting the turning shaft; and a positioning means for selectively positioning the spindle unit at the vertical position and the inclined position.

3. An NC machine tool according to claim 1, wherein said chuck means comprises a vacuum chuck enabling for chucking the workpiece with a small diameter of 2–5 mm.

4. An NC machine tool according to claim 1, wherein said machine tool further comprises a control axis for feeding the column; a control axis for feeding the table in the perpendicular direction to the moving direction of the column; said machine tool being precise-working machine tool for working a concave surface of the work piece by a two-axes synthesizing feed motion.

5. An NC machine tool according to claim 1, wherein said machine tool further comprises measuring means for measuring a distance from a center of the workpiece to an end face of the tool in a vertical position, and a diameter of the tool to output measured data to a numerical control unit.

6. An NC machine tool according to claim 1, wherein said tool is a grindstone.

7. An NC machine tool according to claim 6, wherein said grindstone is to be corrected in shape by truing in the vertical position.

* * * * *